(12) United States Patent
Arts

(10) Patent No.: US 9,685,055 B2
(45) Date of Patent: Jun. 20, 2017

(54) ANTI-THEFT HOME LOCATION CHECK DEVICE

(75) Inventor: Huib Arts, Gouda (NL)

(73) Assignee: ArboProfit, Gouda (NL)

( * ) Notice: Subject to any disclaimer, the term of this patent is extended or adjusted under 35 U.S.C. 154(b) by 2352 days.

(21) Appl. No.: 11/579,643

(22) PCT Filed: May 3, 2005

(86) PCT No.: PCT/NL2005/000337
§ 371 (c)(1),
(2), (4) Date: Sep. 4, 2008

(87) PCT Pub. No.: WO2005/109363
PCT Pub. Date: Nov. 17, 2005

(65) Prior Publication Data
US 2009/0009283 A1     Jan. 8, 2009

(30) Foreign Application Priority Data
May 6, 2004 (EP) .................................. 04076365

(51) Int. Cl.
| | |
|---|---|
| G05B 19/00 | (2006.01) |
| G08B 13/14 | (2006.01) |
| G06F 21/31 | (2013.01) |
| G06F 11/34 | (2006.01) |
| G06F 21/12 | (2013.01) |

(52) U.S. Cl.
CPC .......... *G08B 13/1418* (2013.01); *G06F 11/34* (2013.01); *G06F 21/12* (2013.01); *G06F 21/31* (2013.01)

(58) Field of Classification Search
CPC .......... G06F 21/31; G06F 11/34; G06F 21/12; G06F 2201/86; G08B 13/1418
USPC ...... 340/426.11, 426.12, 426.19, 568.1, 5.21, 340/5.28, 5.31, 539.13, 8.1, 6.1
See application file for complete search history.

(56) References Cited

U.S. PATENT DOCUMENTS 5,406,261 A * 4/1995 Glenn ........................ 340/571
5,748,084 A    5/1998 Isikoff
(Continued)

FOREIGN PATENT DOCUMENTS

GB        2306736 A    5/1997
JP         2002173003    6/2002
(Continued)

*Primary Examiner* — Joseph Feild
*Assistant Examiner* — Rufus Point
(74) *Attorney, Agent, or Firm* — The Webb Law Firm

(57) ABSTRACT

An anti-theft device for an electronics apparatus, including (a) locating means for determining an actual location, (b) storage means for storing a permissible location, and (c) processing means connected to the locating means and storage means. The processing means is configured to retrieve the actual location from the locating means, and to compare the actual location against the permissible location. The processing means is further configured to disable at least part of the functionality of the electronics apparatus if the actual location is more than a predetermined distance from the permissible location. The processing means is further configured to enter the anti-theft device in a standby mode, wherein the electronics apparatus is never disabled by the anti-theft device, and the standby mode may be entered for a predetermined time period.

12 Claims, 2 Drawing Sheets

(56) References Cited

U.S. PATENT DOCUMENTS

| | | | |
|---|---|---|---|
| 5,798,732 A * | 8/1998 | Eshenbach | G01S 19/243 |
| | | | 342/352 |
| 6,457,129 B2 * | 9/2002 | O'Mahony | 726/4 |
| 6,501,380 B1 | 12/2002 | Jakobsson | |
| 6,614,349 B1 * | 9/2003 | Proctor et al. | 340/572.1 |
| 6,618,810 B1 | 9/2003 | Dirie | |
| 6,950,944 B2 * | 9/2005 | Yager | G06F 21/34 |
| | | | 380/274 |
| 7,373,657 B2 * | 5/2008 | Walker | 726/4 |
| 7,701,335 B2 * | 4/2010 | Van Dongen | G08B 13/1418 |
| | | | 340/506 |
| 2001/0011352 A1 | 8/2001 | O'Mahony | |
| 2002/0099503 A1 | 7/2002 | Mishra et al. | |
| 2002/0112174 A1 * | 8/2002 | Yager | G06F 21/34 |
| | | | 726/2 |
| 2005/0231357 A1 * | 10/2005 | Kanayama | H04N 7/18 |
| | | | 340/539.13 |
| 2005/0242918 A1 * | 11/2005 | Van Dongen | G08B 13/1418 |
| | | | 340/3.1 |
| 2007/0247308 A1 * | 10/2007 | Van Dongen | G08B 13/1418 |
| | | | 340/539.19 |

FOREIGN PATENT DOCUMENTS

| | | | |
|---|---|---|---|
| WO | 0175830 A1 | 10/2001 | |
| WO | WO01/75830 | * 10/2001 | |

* cited by examiner

ANTI-THEFT HOME LOCATION CHECK DEVICE

FIELD OF THE INVENTION

The present invention relates to an anti-theft device for an electronics apparatus, comprising locating means for determining an actual location, storage means for storing a permissible location, and processing means connected to the locating means and storage means, in which the processing means are arranged to retrieve the actual location from the locating means, to compare the actual location against the permissible location, and to disable at least part of a functionality of the electronics apparatus if the actual location is more than a predetermined distance from the permissible location.

BACKGROUND OF THE INVENTION

Such a device is known from American patent application US2001/0011352, which describes a method and system for theft prevention of a computer system.

Furthermore, Japanese patent publication JP2002173003 describes a theft prevention system for earth-moving equipment, i.e. machinery driven by an engine, which can be utilised in different geographic locations. In this invention, the earth moving equipment comprises means to determine the actual location and compare it to a predetermined permissible area, which may be a different area each time depending on the work to be done. The permissible area is set up by an operator or a management department of the earth-moving equipment.

In case the earth-moving equipment is outside the permissible area, the operation of the earth-moving equipment is interrupted by shutting down the engine. Furthermore, an alarming signal including the actual location can be transmitted from a transmitter in the earth moving equipment to a monitoring station via satellite so that the stolen earth-moving equipment can be retrieved or alternatively that the shutting down of the engine may be reversed by the monitoring station when the machinery was moved outside the permitted area by accident.

Note that as the monitoring of the machinery is performed at a remote location, a satellite transmitter is needed for each piece of earth-moving equipment that needs to be protected which makes this solution relatively expensive.

SUMMARY OF THE INVENTION

The present invention aims to provide an anti-theft device, which is particularly suited to prevent theft of electrical apparatus, more specifically consumer electrical apparatus, such as TV-sets, HiFi-sets, computers, etc. and electrical apparatus for commercial applications such as servers, measurement and medical equipment.

According to the present invention, a theft control device is provided according to the preamble of claim 1 as defined above, in which the processing means are further arranged to enter a standby mode in which the electronics apparatus is never disabled, and in which the standby mode is entered for a predetermined time period.

The present invention allows an electronics apparatus to be moved to a location that differs from the permissible location but needs to be operable, for example in case of maintenance, repair or mobile use. The standby mode is entered for a specified time period, so that a difference between the actual location and the permissible location does not lead to an interruption of the functionality, for example during travel or in case of a mobile electronics apparatus, such as a laptop PC (Personal Computer). The time period may be a preprogrammed time period, or may be entered by the user. Furthermore, the present invention provides a discouragement of theft of the electronics apparatus in a cost-effective manner, as the electrical apparatus, once stolen and taken to another location, is disabled from proper functioning. The actual location and permissible location may be in a different format, and the processing means are arranged to recalculate the actual location or the permissible location. Ideally, the predetermined distance from the permissible location is very small, i.e. the electronics apparatus (which is usually at a fixed location in home) will stop functioning properly when taken away from its normal location.

The part of the functionality of the electronics apparatus which is disabled according to the present invention may depend on the type of apparatus concerned. E.g. from a TV-set, the display screen may be disabled, or from a HiFi-set, the speaker outputs may be disabled. Also, when present, a CPU or other processor may be disabled. By disabling only a part of the functionality of an electronics apparatus, it is immediately clear to a possible buyer that the apparatus has been stolen, as it doesn't function properly, however, for the thief it is very difficult to restore that part of the functionality of the apparatus. Thus, the electrical apparatus, once stolen and taken away from the permissible location, becomes worthless.

In a further embodiment, the processing means are arranged to disable the at least part of the functionality of the electronics apparatus by disconnecting a power supply to the part of the electronics apparatus. Electronics apparatus usually comprise a number of modules, which may be disabled very simple by interrupting the power supply thereto. As an alternative, the function of the electronics apparatus may be disabled using a software blocking. This is particularly suited for consumer electronics apparatus which incorporate software modules, which in co-operation with hardware modules, perform a predetermined function.

In a further embodiment, the processing means are further arranged to perform retrieving, comparing and/or disabling only once, e.g. at power up of the electronics apparatus. This simplifies the functioning of the anti theft device of the present invention, while still providing sufficient safeguard against theft.

The processing means are arranged to retrieve the actual location at a first power up of the electronics apparatus in a further embodiment, and store the retrieved actual location as the permissible location. This may be performed by the end user and/or after inputting a unique code, e.g. by using a hardware key or by using voice recognition. This automatic programming of the permissible location is easier for the user than entering a location code (or co-ordinates), and will eliminate the chance of entering a wrong permissible location.

In a further embodiment, the locating means comprise a satellite based positioning system, such as GPS (Global Positioning System) for determining the actual location, which is a well-known and cost-effective technology.

The permissible location is represented by a postal zip code, possibly augmented with a home number, in a further embodiment, which is a practical and convenient format for the permissible location, as it can be easily entered by a user.

In a further embodiment, the standby mode is entered after receiving a unique code, e.g. from a hardware key interfacing with the processing means, which ensures that only a rightful owner or an authorized person can initiate a circumvention of interruption of the at least part of the functionality of the electronics apparatus by the theft control device.

The anti-theft device comprises a user interface in a further embodiment, in order to allow the user to enter one or more permissible locations, change a permissible location, e.g. in case of a move, or enter or change an authorization code.

In a further advantageous embodiment, the user interface comprises voice recognition means in order to determine whether the use is authorized to setup the theft control device.

The processing means are connected to display means, in a further embodiment, and the processing means are further arranged for displaying the permissible locations when the actual location is not equal to the permissible location, in order to display the permissible location of the electronics apparatus.

In a further embodiment, the theft control device comprises a transmitter, such as a GSM module, connected to the processing means, in which the transmitter is arranged to transmit a signal when the actual location is more than the predetermined distance from the permissible location. The signal, comprising a unique code, such as the zip code and street number of the owner of the may be sent to a surveillance company or the authorities, in order to localise and retrieve the stolen apparatus

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF PREFERRED EMBODIMENTS

Figure 1:
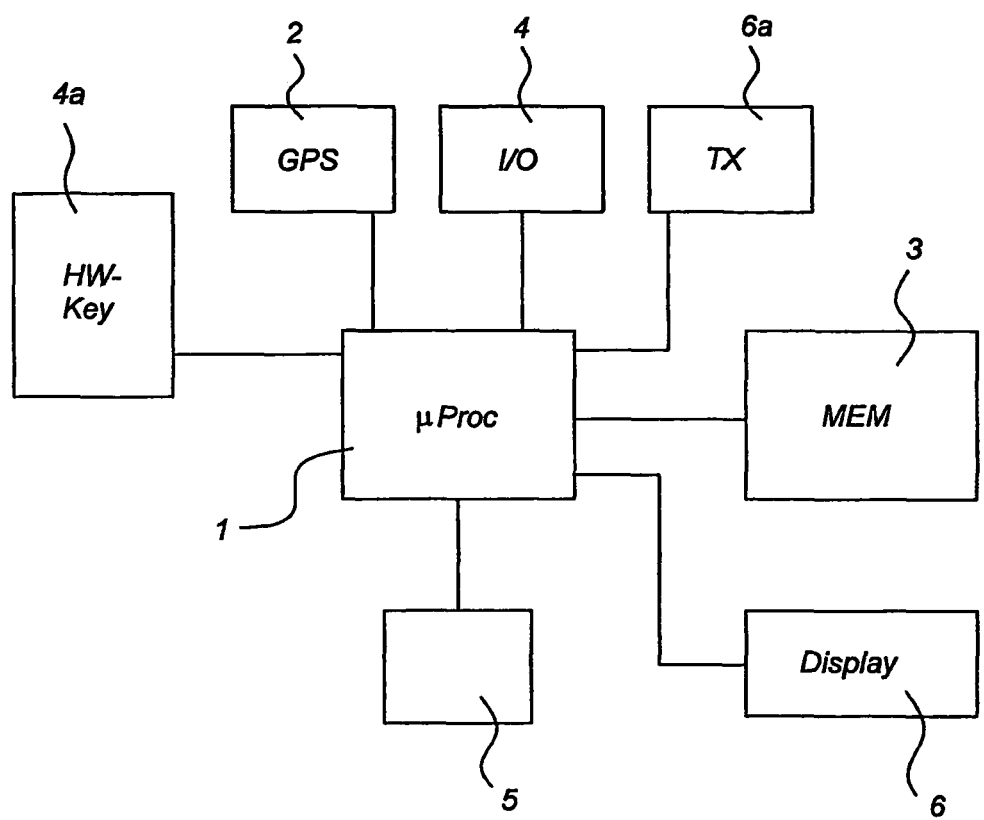
FIG. 1 shows a schematic diagram of a theft control device according to an embodiment of the present invention.

FIG. 1 schematically depicts a diagram of the theft control device or anti-theft device according to an embodiment of the present invention. Processing means 1, connected to locating means 2 and storage means 3, retrieve an actual location from the locating means 2 and a permissible location from the storage means 3.

The processing means 1 provide an interrupt signal to an electronics apparatus 5, e.g. PC or DVD-player or the like, in order to disable at least a part of a functionality of the electronics apparatus 5, if the retrieved actual location does not match the retrieved permissible location. For example, in case of a DVD-player, only the receiver of the remote control that is mounted in the DVD-player could be disabled, limiting the functionality of the DVD-player to the functionality associated with the control buttons on the front plate of the DVD-player. In an alternative embodiment, e.g. the disc tray of the DVD-player is disabled if the actual location differs from the permissible location. A screen or display of a television could be disabled in a further exemplary embodiment. Also, bias voltage of one or more electrical amplifiers in the electronics apparatus could be reduced to generate an interference signal that prevents the electronics apparatus from operating according to specifications, such as e.g. minimum SNR (Signal-to-Noise Ratio) in case of a CD-player. Furthermore, a portion of the software embedded in a storage means of the electronics apparatus could be disabled in a further embodiment.

In a further advantageous embodiment of the present invention, upon activation of the theft control device, the processing means 1 retrieve the actual location from the locating means 2 and record the actual location in the memory location for the permissible location in the storage means 3. This is an attractive solution since the permissible location is set up without a need for knowledge on defining the permissible location by the user.

Furthermore, user interface 4 is connected to the processing means 1 and is arranged for providing coordinates of one or more permissible locations to the processing means 1 for storage in the local storage means 3. The coordinates of the permissible locations could e.g. be a postal zip code and a home number, a pair of longitudinal and latitudinal coordinates or a set of GPS coordinates. It is important to note that such an arrangement may require a conversion of the coordinates of the permissible location to the coordinate-system of the actual location in order to be able to compare the permissible and the actual location.

The user interface 4 is further arranged for activating a standby mode, which overrules the interruption of the at least a part of the functionality of the electronics apparatus 5 by the theft control device in case of a discrepancy between the actual and permissible location. This feature allows reparation of the electronics apparatus 5 at a location different than the permissible location(s) or use of the theft control device in mobile electronics apparatuses 5. The standby mode can only be activated at a permissible location in a specific embodiment. In a further embodiment, the standby mode could be enabled by physically connecting a hardware key 4a, e.g. a USB (Universal Serial Bus) hardware key, to the processing means 1 while the electronics apparatus 5 is located at the permissible location.

The processing means 1 are further connected to a display 6 being arranged to show the permissible location that is stored in the storage means 3. In a further embodiment, the user interface 4 is arranged to provide a zip code of the permissible location to the processing means 1 for storage in the storage means 3 and the display 6 is further arranged to show the zip code that is stored in the storage means 3.

The processing means 1 may e.g. comprise digital processing circuits, analogue processing circuits or a combination of both, and may be operating under software instructions. The storage means 3 may comprise any type of data storage, such as, but not limited to, RAM, PROM, etc. The locating means 2 may comprise components which are arranged to perform receiver type of functions, such as RF signal processing, e.g. in the form of a GPS receiver and corresponding antenna. Furthermore, the processing means 1, the storage means 3, or both, may be partially or completely integrated in a monolithically grown electronic circuit, in a further embodiment, rendering any modification of the theft control device, in order to circumvent it, practically impossible. Also, the processing means 1 and the storage means 3, or both, may be monolithically integrated with a processing means, e.g. a CPU, of the electronics apparatus in order to further render any modification of the anti-theft device difficult.

In a further embodiment of the present invention, the actual location is retrieved from a GPS (Global Positioning System) and the coordinates of the permissible location, e.g. the combination of a postal zip code and a home number, is converted into a set of GPS coordinates and stored in the local storage means 3. By doing this, the determined actual location can be easily compared to the permissible location without conversion of the format which minimizes the required processing power compared to the case where the GPS coordinates have to be converted to a postal zip code and a home number at every check of the actual location.

The standby mode could, in a further embodiment, be enabled during a user-specified amount of operating time of the processing means 1, e.g. a total number of clock cycles. This may for example be used in case of a repair of the electronics apparatus 5. In an alternative embodiment, the standby mode could be enabled for a predetermined time period specified e.g. by a start time and a completion time. The actual time could, e.g., be retrieved from the locating means 2 in case of a GPS, instead of from a local clock, in order to prevent extension of the absolute duration of the standby time period by changing the time of the local clock. This embodiment is particularly suited for use of an electronic apparatus 5 outside one's house. The electronics apparatus 5 will only be (partially) disabled when it is not back in the permissible location (area) after the completion time.

In a further embodiment, a transmitter means 6a transmits a signal comprising e.g. the actual location provided by the locating means 2 to e.g. a monitoring station if the actual location is outside the permissible location in order to facilitate a repatriation of the electronic apparatus 5 to the permissible location.

Figure 2:
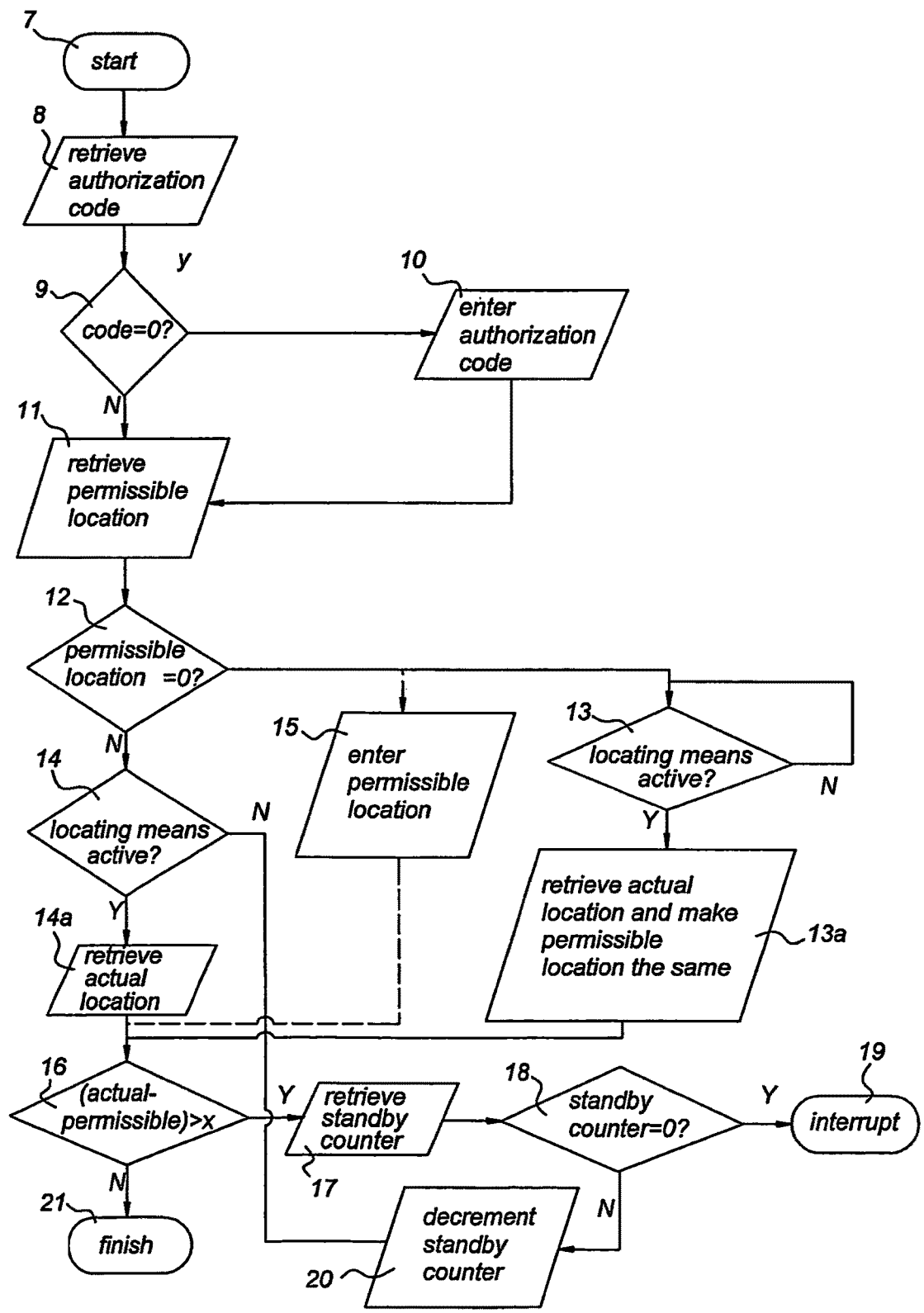
FIG. 2 is an illustration in process flowchart form of a method for theft control in accordance with the present invention.

FIG. 2 is an illustration of a process flow diagram of a method for setting up an authorization code and a permissible location in a theft control device in accordance with an exemplary embodiment of the present invention. The method starts at block 7 with the start of the theft control device procedure. At function block 8, the theft control device checks the content of the memory location that is reserved for the authorization code. During normal operation, the authorization code is verified before allowing a change of the permissible location, e.g. in case of a relocation of the owner of the apparatus, or enabling of the standby mode to ensure that the user is a rightful owner and not an unlawful user of the electronics apparatus 5. At block 9, the content of the memory location in the storage means 3 that is reserved for the authorization code is retrieved by the processing means 1. If it is equal to zero, an authorization code needs to be entered via the user interface device 4 at block 10.

A voice recognition means, including e.g. a microphone for converting voice to an electrical signal and an IC (integrated Circuit) specifically designed for electrical voice signal processing, could be used as a user interface 4 to verify the identity of a user who is attempting to change e.g. the permissible location(s) or enable the standby mode. Alternatively, the identity of the user could be verified by connecting a hardware-key 4a to the processing means 1.

In case the theft control device has been previously set up, the retrieved authorization code is non-zero, and the processing means 1 proceed to the next step at function block 11 and subsequently retrieves the permissible location from the local storage memory 3. Next the processing means 1 test the value of the permissible location in function block 12. In case the permissible location is non-zero, the method moves to function block 14 to check whether the locating means 2 are functional, e.g. in case of a GPS the processing means 1 will check whether the GPS receives a signal. If this is not true, the method will proceed to function block 17 in order to check whether the standby mode is enabled. If it is true, the actual location will be retrieved at function block 14a. If the permissible location retrieved in function block 11 is zero, the processing means 1 test the proper functionality of the locating means 2 in function block 13a. If the locating means 2 are functional, the permissible location is by retrieving the actual location and making the permissible location equal to the actual location in function block 13a. If not, the processing means 1 will loop back to function block 13 until the locating means 2 are functional.

In a further embodiment of the present invention, as indicated by the dashed lines to block 15, the permissible location could be defined by the postal zip code and home number of the location where the electronics apparatus 5 will be used. In this case, the theft control device will convert the zip code and home number of the permissible location into coordinates in the format that is provided by the locating means 2, e.g. GPS coordinates, and will store the resulting coordinates in the storage means 3 for future reference and comparison with the GPS coordinates provided by the locating means 2. The conversion of the zip code and home number into, e.g., GPS coordinates could be done by means of a lookup table.

After setting the permissible location equal to the actual location in block 13a or retrieving the actual location in function block 14a in case the permissible location already exists, the processing means 1 test in function block 16 whether the difference between the actual location and the permissible location is smaller than a predetermined value, e.g. 50 m. If this is true, the electronics apparatus 5 is located at the permissible location, and will be fully functional and operate according to specifications of a supplier of the electronics apparatus. The method will then finish at function block 21. If this is false, the processing means 1 will retrieve the standby counter at function block 17 and test whether the standby counter is equal to zero at function block 18. If the standby counter is equal to zero, the standby mode is not enabled and the processing means 1 will interrupt the at least part of a functionality of the electronics apparatus at function block 19. If the standby counter is non-zero, the standby mode is enabled and the processing means 1 will decrement the standby counter in function block 20, for example at every clock cycle of a CPU clock, and the method will loop back to function block 17 until the standby counter is equal to zero. In this method, the standby counter represents the number of clock cycles of the processing means 1 during which the interruption of at least a part of the functionality of the electronics apparatus is overruled and ensures that the electronics apparatus 5 will be fully functional at e.g. a reparation location which is usually outside the permissible location, or, in case of a mobile electronics apparatus, such as e.g. a video camera or a laptop PC (Personal Computer). In a further embodiment, the standby mode could be specified to be enabled until a predetermined moment in time, e.g. the end of a vacation or business trip, instead of in terms of a maximum number of clock cycles (i.e. total operating time of the processing means 1).

Alternatively, the function block 16 is arranged to check the actual location against the permissible location repeatedly, e.g. at a predetermined frequency, and the flow chart is adapted to loop back to block 14a when the actual location is within a predetermined distance from the permissible location, instead of proceeding to block 21.

While specific embodiments of the invention have been described above, it will be appreciated that the invention may be practiced otherwise than as described. The description is not intended to limit the scope of the invention, which is defined by the appended claims. E.g. it will be clear to the person skilled in the art that multiple permissible locations may be stored and used in the present invention.

The invention claimed is:

1. An anti-theft device for an electronics apparatus, comprising:
locating means for determining an actual location;
storage means for storing a permissible location; and
processing means connected to the locating means and storage means, wherein the processing means is configured to:
retrieve the actual location from the locating means;
compare the actual location against the permissible location; and
disable at least part of a functionality of the electronics apparatus if the actual location is more than a predetermined distance from the permissible location, wherein the processing means is further configured to enter the anti-theft device in a standby mode, in which the electronics apparatus is never disabled by the anti-theft device even if the electronic apparatus is not at the permissible location, and wherein the user can activate the standby mode at the permissible location during a user specified amount of operating time of the processing means, wherein the locating means comprises a Global Positioning System (GPS), wherein the processing means comprises a local clock, and wherein the processing means activates the standby mode for the user specified amount of operating time according to an actual time retrieved from the GPS instead of according to the local clock.

2. The anti-theft device according to claim 1, wherein the processing means is configured to disable the at least part of the functionality of the electronics apparatus by disconnecting a power supply from at least a part of the electronics apparatus.

3. The anti-theft device according to claim 1, wherein the processing means is configured to perform the retrieving, the comparing or the disabling steps only at the time of power up of the electronics apparatus.

4. The anti-theft device according to claim 1, wherein the processing means is configured to retrieve the actual location at the time of a first power up of the electronics apparatus, and store the retrieved actual location as the permissible location.

5. The anti-theft device according to claim 1, wherein the permissible location is represented by a postal zip code.

6. The anti-theft device according to claim 1, wherein the standby mode is entered only after receiving a unique code.

7. The anti-theft device according to claim 1, further comprising a user interface connected to the processing means.

8. The anti-theft device according to claim 7, wherein the user interface includes means configured to convert a voice signal to an electrical signal, and wherein the processing means is further configured to process the electrical signal.

9. The anti-theft device according to claim 1, further comprising a display connected to the processing means, wherein the processing means is further configured to display the permissible locations when the actual location is not equal to the permissible location.

10. The anti-theft device according to claim 1, further comprising a transmitter connected to the processing means, wherein the transmitter is configured to transmit a signal when the actual location is more than the predetermined distance from the permissible location.

11. The anti-theft device according to claim 1, wherein the user specified amount of operating time of the processing means is a total number of clock cycles of the processing means.

12. An anti-theft device for an electronics apparatus, comprising:
locating means for determining an actual location;
storage means for storing a permissible location; and
processing means connected to the locating means and storage means, wherein the processing means is configured to:
retrieve the actual location from the locating means;
compare the actual location against the permissible location; and disable at least part of a functionality of the electronics apparatus if the actual location is more than a predetermined distance from the permissible location, wherein the processing means is further configured to enter the anti-theft device in a standby mode, in which the electronics apparatus is never disabled by the anti-theft device even if the electronic apparatus is not at the permissible location, wherein the user can activate the standby mode for a predetermined period of time at the permissible location, wherein the locating means comprises a Global Positioning System (GPS), wherein the processing means comprises a local clock, and wherein the processing means activates the standby mode for the predetermined period of time according to an actual time retrieved from the GPS instead of according to the local clock.

* * * * *